(12) United States Patent
Hiraka

(10) Patent No.: US 10,718,974 B2
(45) Date of Patent: Jul. 21, 2020

(54) PLANAR LIGHT SOURCE DEVICE AND DISPLAY DEVICE

(71) Applicant: Enplas Corporation, Saitama (JP)

(72) Inventor: Kensuke Hiraka, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/490,660

(22) PCT Filed: Feb. 28, 2018

(86) PCT No.: PCT/JP2018/007500
§ 371 (c)(1),
(2) Date: Sep. 3, 2019

(87) PCT Pub. No.: WO2018/159676
PCT Pub. Date: Sep. 7, 2018

(65) Prior Publication Data
US 2019/0391451 A1 Dec. 26, 2019

(30) Foreign Application Priority Data
Mar. 3, 2017 (JP) ................................. 2017-040964

(51) Int. Cl.
*G02F 1/13357* (2006.01)
*G02B 3/04* (2006.01)

(52) U.S. Cl.
CPC ......... *G02F 1/133606* (2013.01); *G02B 3/04* (2013.01); *G02F 1/133603* (2013.01);
(Continued)

(58) Field of Classification Search
CPC ......... G02F 1/133606; G02F 1/133603; G02B 3/04
See application file for complete search history.

(56) References Cited

U.S. PATENT DOCUMENTS

2010/0027243 A1* 2/2010 Nakanishi ......... G02F 1/133605
362/97.1
2010/0259706 A1 10/2010 Kuwaharada et al.
(Continued)

FOREIGN PATENT DOCUMENTS

WO 2009-157166 A1 12/2009

OTHER PUBLICATIONS

International Search Report from International Application No. PCT/JP2018/007500 dated May 15, 2018.

*Primary Examiner* — Evan P Dzierzynski
(74) *Attorney, Agent, or Firm* — Brundidge & Stanger, P.C.

(57) ABSTRACT

A planar light source device having a plurality of light emission devices and a light diffusion plate. For each of the light emission devices, the light beam from among light beams satisfying $\theta 3/\theta 1<1$ that has the smallest emission angle $\theta 1x\min$ satisfies the relationship $Ax<Px$, where $Ax$ is the distance from the center axis of the point on the light diffusion plate that is reached by the light beam emitted at the emission angle $\theta 1x\min$, which is greater than $Px/2$. The light beam from among light beams satisfying $\theta 3/\theta 1<1$ that has the smallest emission angle $\theta 1y\min$ satisfies the relationship $Ay<Py$, where $Ay$ is the distance from the center axis of the point on the light diffusion plate that is reached by the light beam emitted at the emission angle $\theta 1y\min$, which is greater than $Py/2$.

16 Claims, 10 Drawing Sheets

(52) U.S. Cl.
CPC ............ *G02F 2001/133607* (2013.01); *G02F 2001/133613* (2013.01)

(56) References Cited

U.S. PATENT DOCUMENTS

| | | | |
|---|---|---|---|
| 2013/0013252 A1* | 1/2013 | Ono | G01B 11/24 702/167 |
| 2014/0160733 A1* | 6/2014 | Ono | F21K 9/60 362/97.1 |
| 2015/0276170 A1* | 10/2015 | Motoyanagi | F21V 5/04 362/335 |

* cited by examiner

PLANAR LIGHT SOURCE DEVICE AND DISPLAY DEVICE

TECHNICAL FIELD

The present invention relates to a surface light source device and a display apparatus.

BACKGROUND ART

In recent years, for the purpose of energy saving and downsizing, light emitting diodes (hereinafter also referred to as "LEDs") are used as light sources for lighting. Light emitting devices each having a combination of an LED and a light flux controlling member for controlling distribution of light emitted from the LED are used in place of, for example, fluorescent lighting and halogen lamps. Further, direct surface light source devices each incorporating the light emitting devices in a lattice shape are used as a backlight in transmission type image display apparatuses such as liquid crystal display apparatuses (refer to, for example, PTL 1).

FIGS. 1A to 1C illustrate a configuration of surface light source device 10 disclosed in PTL 1. FIG. 1A is a schematic plan view of surface light source device 10, FIG. 1B is a plan view of light emitting device 30 of surface light source device 10, and FIG. 1C is a cross-sectional view taken along line A-A of FIG. 1B. In FIG. 1A, a broken line schematically illustrates a range irradiated with light emitted from light emitting device 30.

As illustrated in FIGS. 1A to 1C, surface light source device 10 disclosed in PTL 1 includes printed wiring substrate 20, a plurality of light emitting devices 30 disposed on printed wiring substrate 20 in a rectangular lattice shape and a light diffusion plate 32 disposed over the plurality of light emitting devices 30. Each of light emitting devices 30 includes light emitting element 35 and a light guide member (light flux controlling member) 40 disposed so as to cover light emitting element 35.

Light guide member 40 includes substantially hemisphere-shaped lens 41 and flange 42 disposed to surround lens 41. Lens 41 includes incidence surface 44, namely the inner surface of recess 43 disposed on the rear side, and emission surface 45 disposed on the front side. Emission surface 45 includes two flat surfaces 46 parallel to central axis CA and to each other, and curved surface 47 protruding toward the surface and disposed between two flat surfaces 46. In surface light source device 10 disclosed in PTL 1, light guide member 40 controls light emitted from light emitting element 35 so that the light expands more in one direction, where the distance between light emitting devices 30 is longer (long side direction in the rectangular lattice; X-direction), than in another direction, where the distance between light emitting devices 30 is shorter (short side direction in the rectangular lattice; Y-direction). This configuration enables uniform irradiation of light diffusion plate 32 in the surface light source device disclosed in PTL 1 even in a case where light emitting devices 30 are disposed in a rectangular lattice shape.

CITATION LIST

Patent Literature

PTL 1
WO2009/157166

SUMMARY OF INVENTION

Technical Problem

In surface light source device 10 disclosed in PTL 1, for example, light diffusion plate 32 is disposed perpendicularly to a horizontal plane in some cases. In such a case, light diffusion plate 32 may be distorted by its own weight, and thus the distance between printed wiring substrate 20 and light diffusion plate 32 may become different between the central part and the outer edge part of surface light source device 10. Therefore, luminance unevenness may be generated on the light diffusion plate.

An object of the present invention is to provide a surface light source device and a display apparatus capable of suppressing the generation of luminance unevenness on a light diffusion plate even when the distance between a substrate and the light diffusion plate changes.

Solution to Problem

The surface light source device according to the present invention includes the following: light emitting devices each including a light emitting element and a light flux controlling member configured to control a distribution of light emitted from the light emitting element, in which a light emitting center of the light emitting element is positioned on a central axis of the light flux controlling member, and the light emitting devices are arranged in a shape of a lattice such that a center-to-center distance in a first direction is Px, and a center-to-center distance in a second direction orthogonal to the first direction is Py; and a light diffusion plate disposed on a front side of the light emitting devices, the light diffusion plate transmitting light emitted from the light emitting devices while diffusing the light, in which the light flux controlling member includes an incidence surface that is an inner surface of a recess opened to a rear side, the incidence surface being disposed to intersect the central axis; and an emission surface disposed on the front side, the emission surface including a first emission surface disposed to intersect the central axis, and a second emission surface disposed to surround the first emission surface, the second emission surface protruding toward the front side, and in which for each of the light emitting devices, on a first cross section that runs along the first direction and includes the central axis, a light beam having smallest light emission angle θ1 among light beams satisfying formula (1) below reaches the light diffusion plate so as to satisfy formula (2) below, the smallest light emission angle θ1 being light emission angle θ1xmin; and for each of the light emitting devices, on a second cross section that runs along the second direction and includes the central axis, a light beam having smallest light emission angle θ1 among the light beams satisfying the formula (1) below reaches the light diffusion plate so as to satisfy formula (3) below, the smallest light emission angle θ1 being light emission angle θ1ymin, $$θ3/θ1<1 \quad \text{Formula (1)}$$

[in the formula (1), θ1 is an angle of a traveling direction of an arbitrary light beam relative to the central axis, in which the arbitrary light beam travels from the light emitting center to the incidence surface; and θ3 is an angle of a traveling direction of the arbitrary light beam relative to the central axis, in which the arbitrary light beam is emitted from the light emitting center at light emission angle θ1, propagates through the light flux controlling member and is emitted from the emission surface to travel from the emission surface to the light diffusion plate]

$$Px/2<Ax<Px \quad \text{Formula (2)}$$

[in the formula (2), on the first cross section, Ax is a distance from the central axis to a reaching point on the light diffusion plate where the light beam emitted from the light emitting center at light emission angle θ1xmin reaches]

$$Py/2<Ay<Py \quad \text{Formula (3)}$$

[in the formula (3), on the second cross section, Ay is a distance from the central axis to a reaching point on the light diffusion plate where the light beam emitted from the light emitting center at light emission angle θ1ymin reaches].

The display apparatus according to the present invention includes the surface light source device according to the present invention, and an irradiation member to be irradiated with light emitted from the surface light source device.

Advantageous Effects of Invention

The surface light source device according to the present invention can suppress the generation of a bright part on a surface to be irradiated even when the distance between a substrate and the surface to be irradiated changes. As the display apparatus according to the present invention includes the surface light source device capable of suppressing the generation of a bright part, luminance unevenness is less likely generated on a member to be irradiated (herein also referred to as "irradiation member") in the display apparatus.

DESCRIPTION OF EMBODIMENT

Hereinafter, a surface light source device and a display apparatus according to the present invention will be described in detail with reference to the accompanying drawings. In the following description, as a representative example of the surface light source device of the present invention, described is a surface light source device which is suitable for a backlight of a liquid crystal display apparatus or the like, and which includes light emitting devices disposed in a lattice shape.

Embodiment 1

(Configuration of Surface Light Source Device)

Figure 1A:
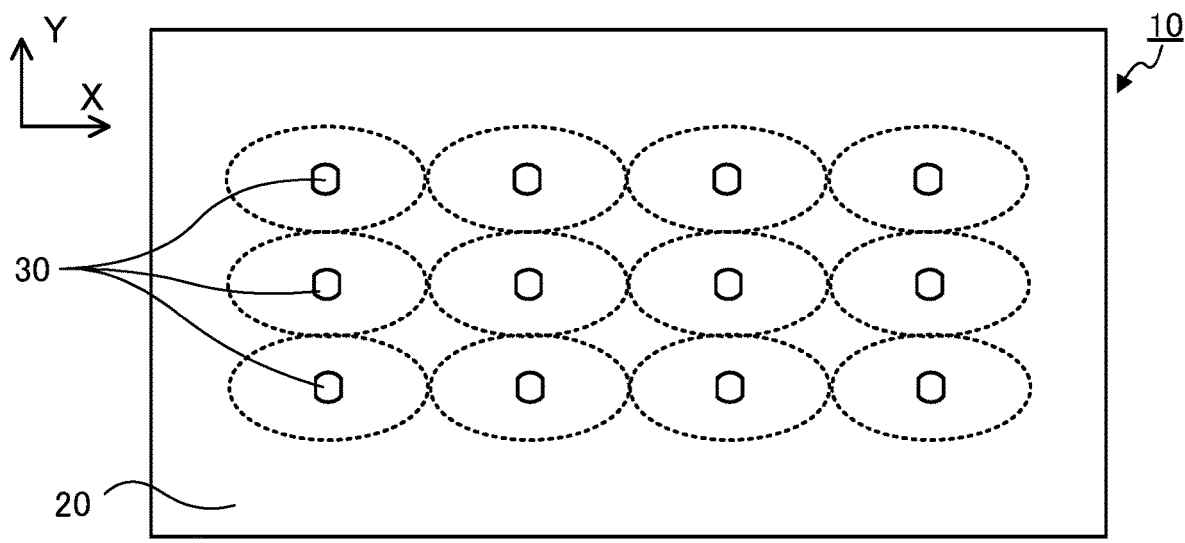
FIGS. 1A to 1C illustrate a configuration of a surface light source device disclosed in PTL 1.
Figure 1B:
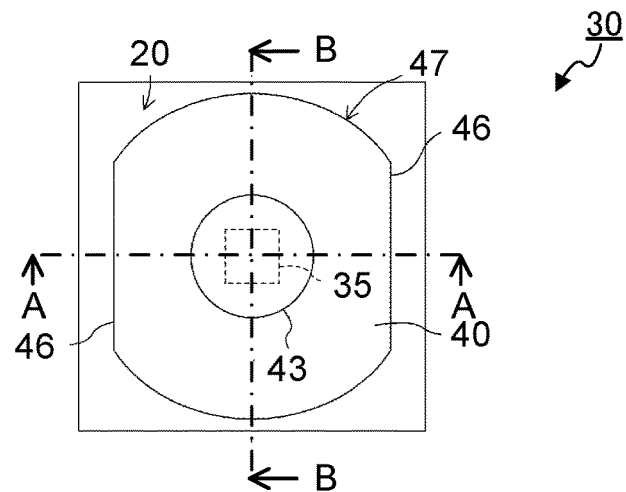
Figure 1C:
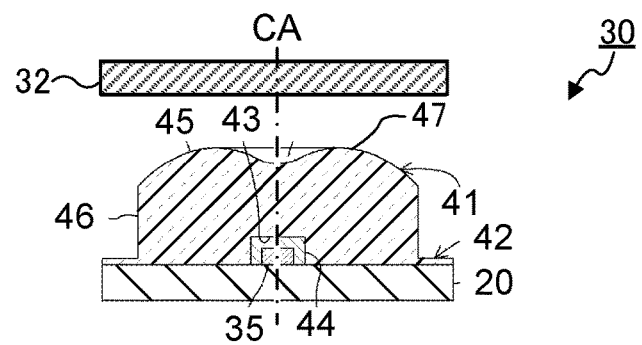
Figure 2A:
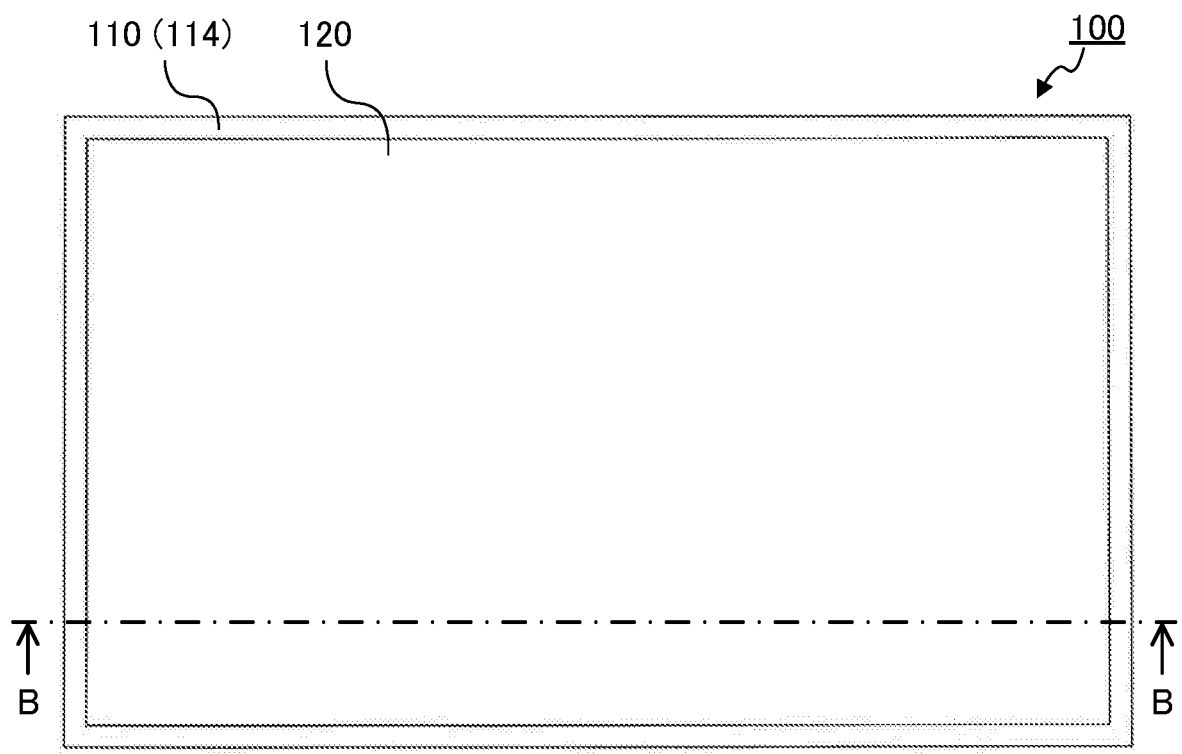
FIGS. 2A and 2B illustrate a configuration of a surface light source device according to Embodiment 1 of the present invention.
Figure 4:
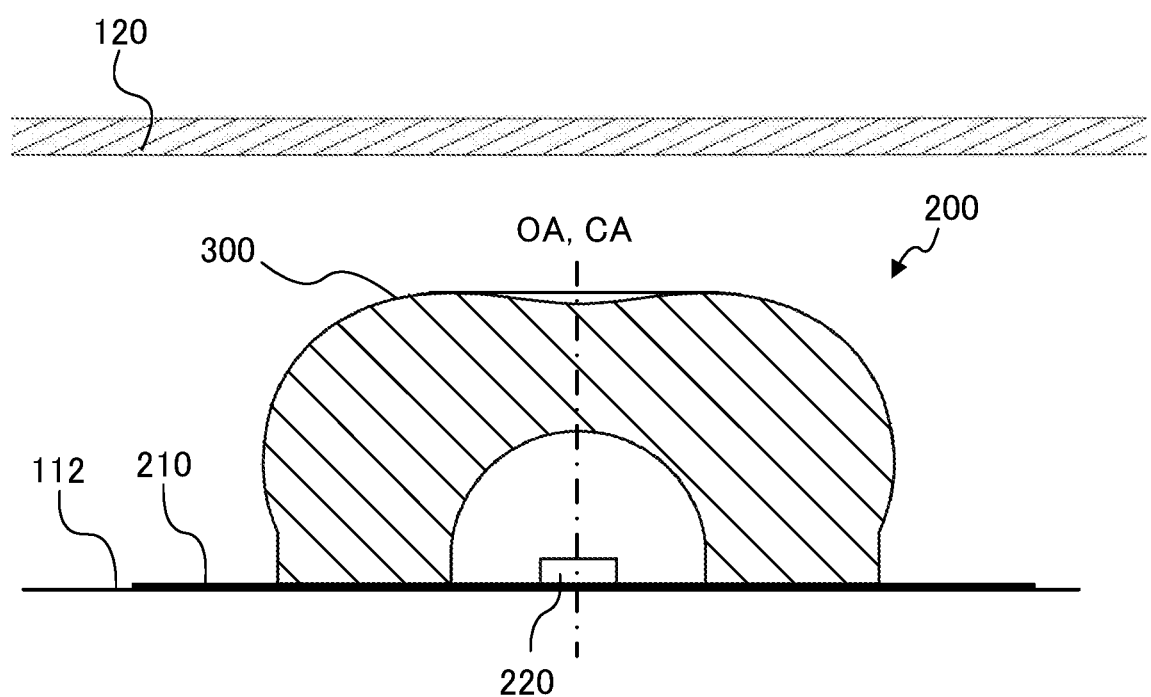
FIG. 4 is a partially enlarged cross-sectional view of the surface light source device.

FIGS. 2A to 4 schematically illustrate a configuration of surface light source device 100 according to Embodiment 1 of the present invention. FIG. 2A is a plan view of surface light source device 100 according to Embodiment 1 of the present invention, and FIG. 2B is a front view of the same. FIG. 3A is a cross-sectional view taken along line A-A of FIG. 2B, and FIG. 3B is a cross-sectional view taken along line B-B of FIG. 2A. FIG. 4 is a partially enlarged cross-sectional view of surface light source device 100.

Figure 2B:
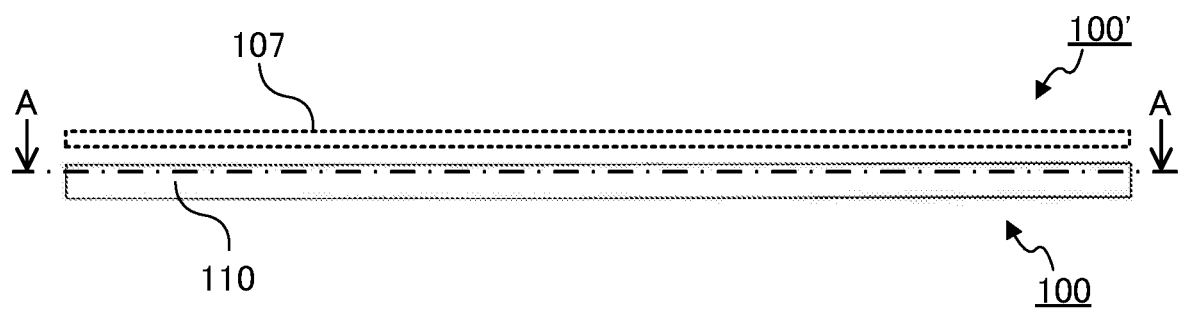
Figure 3A:
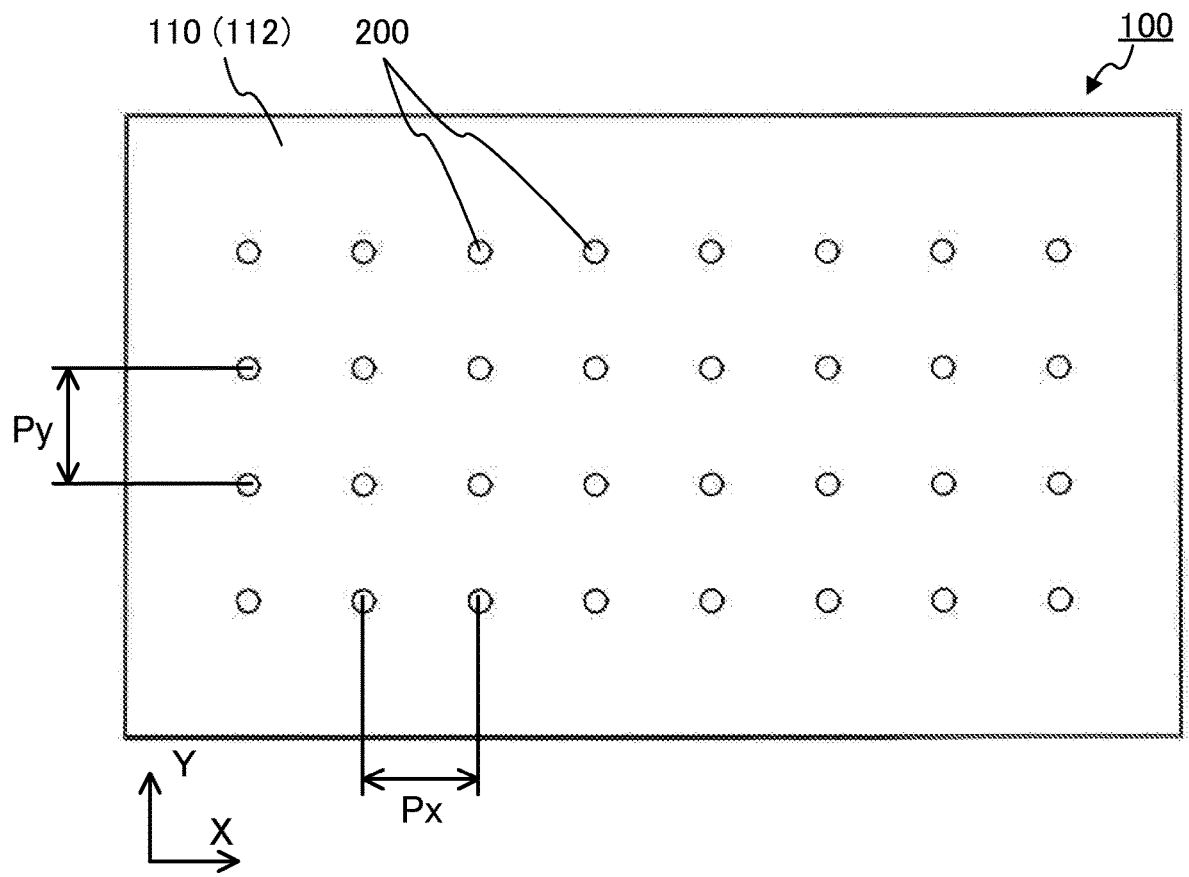
FIGS. 3A and 3B are cross-sectional views of the surface light source device.
Figure 3B:
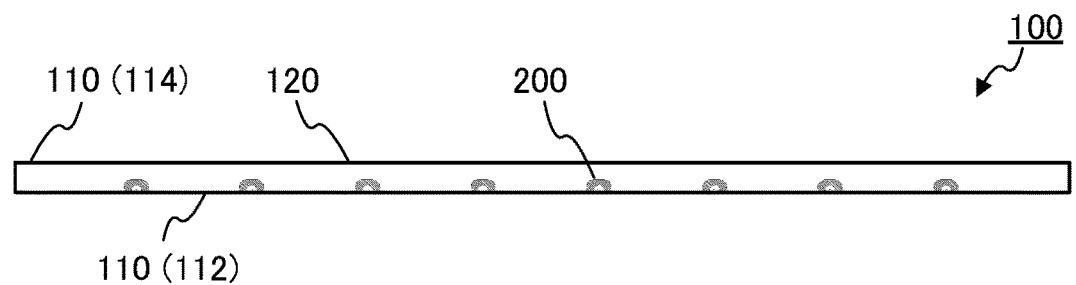

As illustrated in FIGS. 2A, 2B, 3A, 3B and 4, surface light source device 100 includes casing 110, a plurality of light emitting devices 200 and light diffusion plate (surface to be irradiated) 120. Surface light source device 100 of the present invention can be employed for a backlight of a liquid crystal display apparatus or the like. As illustrated in FIG. 2B, surface light source device 100 can also be used as display apparatus 100' in combination with display member (irradiation member) 107 such as a liquid crystal panel (shown in a dotted line in FIG. 2B).

The inner surface of bottom plate 112 of casing 110 functions as a diffusion and reflection surface. On bottom plate 112, substrate 210 having light emitting device 200 disposed thereon is disposed at a predetermined position. Top plate 114 of casing 110 is provided with an opening. Light diffusion plate 120 is disposed so as to cover the opening, and functions as a light emitting surface. The size of the light emitting surface may be, for example, about 400 mm×700 mm.

A plurality of light emitting devices 200 is arranged in a lattice shape on substrates 210 of bottom plate 112 of casing 110. Herein, "arranged in a lattice shape" means arranged so that a unit lattice becomes rectangular. Examples of the unit lattices include lattices in a rectangular shape and lattices in a square shape (square lattice). In the present embodiment, light emitting devices 200 are arranged in a square lattice shape. In the present embodiment, light emitting devices 200 are arranged in a lattice shape such that the center-to-center distance in the first direction (X direction in FIG. 3A) is Px, and the center-to-center distance in the second direction (Y direction in FIG. 3A) orthogonal to the first direction is Py. In the present embodiment, center-to-center distance Px and center-to-center distance Py thus have the same length. Light emitting devices 200 each includes light emitting element 220 and light flux controlling member 300.

Light emitting element 220 is a light source of surface light source device 100, and is mounted on substrate 210. Light emitting element 220 is, for example, a light emitting diode (LED) such as a white light emitting diode. Light emitting element 220 is disposed so that the light emitting center (optical axis OA) thereof is positioned on central axis CA of light flux controlling member 300. Light emitting element 220 is also disposed so that the light emitting center (optical axis OA) thereof coincides with the center of light emitting device 200 (refer to FIG. 4). Herein, "optical axis OA of light emitting element" is a light beam that is in the center of three-dimensional light flux emitted from light emitting element 220. Light emitting elements 220 are disposed in a lattice shape such that the center-to-center distance in the first direction (X direction in FIG. 3A) is Px, and the center-to-center distance in the second direction (Y direction in FIG. 3A) orthogonal to the first direction is Py.

Light flux controlling member 300 is a lens, and fixed on substrate 210. Light flux controlling member 300 is configured to control the distribution of light emitted from light emitting element 220 to expand the direction of the light to travel in the surface directions of substrate 210. Light flux controlling member 300 is disposed over light emitting element 220 so that central axis CA of light flux controlling member 300 coincides with optical axis OA of light emitting element 220 (refer to FIG. 4). Below-described incidence surface 320 and emission surface 330 of light flux controlling member 300 are rotationally symmetric (circularly symmetric in the present embodiment), and rotation axes of the surfaces coincide with optical axis OA of light emitting element 220. The rotation axes of incidence surface 320 and emission surface 330 are referred to as "central axis CA of light flux controlling member."

Light flux controlling member 300 may be formed by integral molding. Any material capable of transmitting light having a desired wavelength may be used as a material for light flux controlling member 300. For example, the material of light flux controlling member 300 is a light-transmissive resin such as polymethylmethacrylate (PMMA), polycarbonate (PC), epoxy resin (EP) or silicone resin, or glass. The main feature of surface light source device 100 according to the present embodiment lies in the configuration of light flux controlling member 300. Therefore, the feature that should be in light flux controlling member 300 will be described in detail below.

Light diffusion plate 120 is a plate-shaped member having light diffusivity, and transmits light emitted from light emitting device 200 while diffusing the light. Light diffusion plate 120 is disposed above light emitting devices 200 and substantially parallel to substrates 210. Typically, light diffusion plate 120 has a size substantially the same as an irradiation member such as a liquid crystal panel. For example, light diffusion plate 120 is formed of a light-transmissive resin such as polymethylmethacrylate (PMMA), polycarbonate (PC), polystyrene (PS) or styrene-methylmethacrylate copolymer resin (MS). To confer light diffusivity, fine irregularities are formed on the surface of light diffusion plate 120, or light diffusion elements such as beads are dispersed inside light diffusion plate 120.

In surface light source device 100 according to the present invention, light flux controlling member 300 controls light emitted from corresponding light emitting element 220 so that the light illuminates a predetermined irradiation region in light diffusion plate 120. As described below, as light flux controlling member 300 appropriately illuminates the predetermined irradiation region, the inner surface of light diffusion plate 120 is illuminated substantially uniformly. The light reaching light diffusion plate 120 from each light flux controlling member 300 passes through light diffusion plate 120 while being diffused. Consequently, surface light source device 100 according to the present invention can uniformly illuminate a planar irradiation member (e.g., a liquid crystal panel).

(Configuration of Light Flux Controlling Member)

Figure 5A:
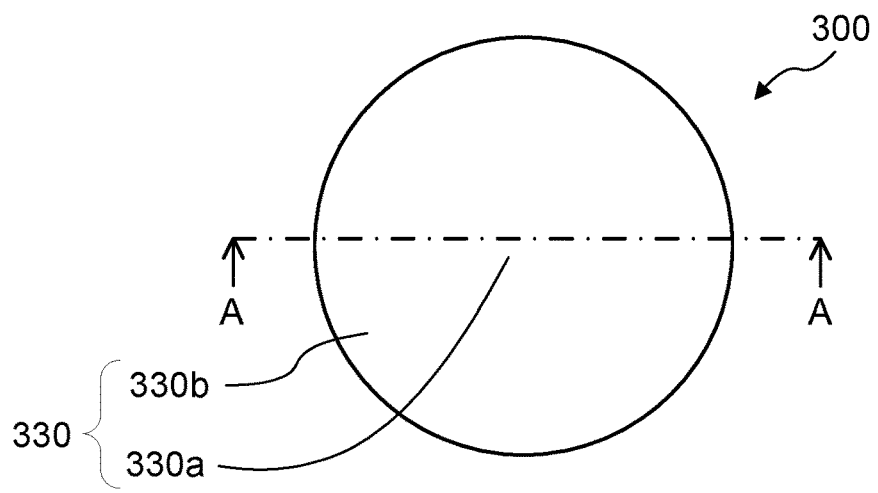
FIGS. 5A to 5C illustrate a configuration of a light flux controlling member.
Figure 5B:
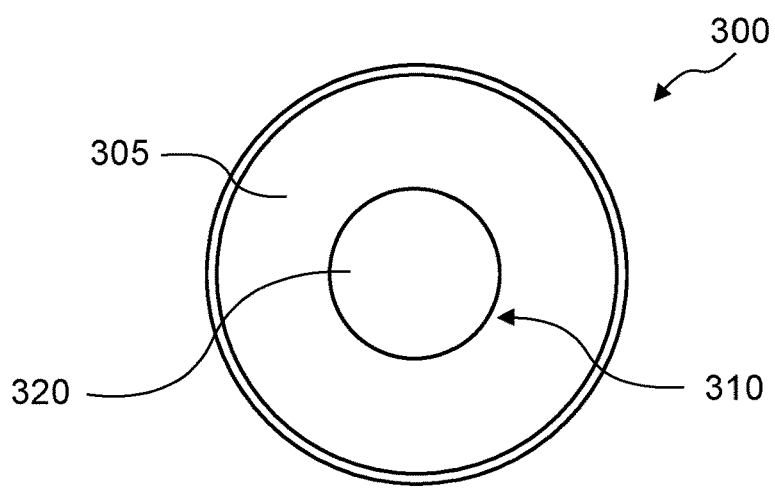
Figure 5C:
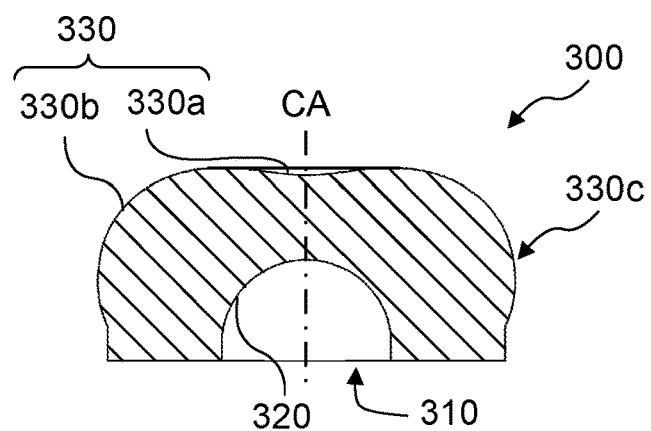

FIGS. 5A to 5C illustrate a configuration of light flux controlling member 300 according to Embodiment 1 of the present invention. FIG. 5A is a plan view of light flux controlling member 300, FIG. 5B is a bottom view of the same, and FIG. 5C is a cross-sectional view taken along line A-A of FIG. 5A.

As illustrated in FIGS. 5A to 5C, light flux controlling member 300 includes incidence surface 320 and emission surface 330. Light flux controlling member 300 may further include a flange for easier handling of light flux controlling member 300, and legs for forming a space to allow heat generated from light emitting element 220 to disperse outside as well as for positioning and fixing light flux controlling member 300 on substrate 210 (neither is illustrated). Light flux controlling member 300 in the present embodiment has a circular shape in plan view.

Incidence surface 320 allows most of light emitted from light emitting element 220 to enter the inside of light flux controlling member 300 while controlling the traveling direction of the light. Incidence surface 320 is an inner surface of recess 310 opened to the rear side. Incidence surface 320 is disposed so as to intersect central axis CA (optical axis OA). Incidence surface 320 intersects central axis CA of light flux controlling member 300, and is rotationally symmetric with central axis CA as a rotation axis (circularly symmetric in the present embodiment). Recess 310 is therefore disposed in the central part of rear surface 305 so as to intersect central axis CA of light flux controlling member 300 (optical axis OA of light emitting element 220) (see, FIG. 4).

Rear surface 305 is a flat surface which is positioned on the rear side of light flux controlling member 300, and extends radially from the opening edge of recess 310.

Emission surface 330 is disposed on the front side of light flux controlling member 300 (light diffusion plate 120 side). Emission surface 330 emits the light entering light flux controlling member 300 toward the outside while controlling the traveling direction of the light. Emission surface 330 intersects central axis CA, and is rotationally symmetric with central axis CA as a rotation axis (circularly symmetric in the present embodiment).

Emission surface 330 includes first emission surface 330a positioned in a predetermined range about central axis CA, and second emission surface 330b continuously formed from the periphery of first emission surface 330a. The shape of first emission surface 330a can be appropriately set. First emission surface 330a may have a shape of a flat surface, a curved surface protruding toward the rear side, or a curved surface protruding toward the front side. In the present embodiment, first emission surface 330a is a curved surface which protrudes toward the rear side and is formed so as to intersect central axis CA. Second emission surface 330b is a smoothly curved surface which protrudes toward the front side, and is positioned in the surrounding area of first emission surface 330a. Second emission surface 330b includes overhanging part 330c in a cross section including central axis CA. Herein, "overhanging part" is a part which is at the outer end of second emission surface 330b, and which protrudes outside in the direction perpendicular to central axis CA compared to the end of second emission surface 330b which is positioned at the bottom in the direction along central axis CA. In the present embodiment, the presence of overhanging part 330c in second emission surface 330b enables control such that part of light emitted from light emitting element 220, which has a larger angle relative to optical axis OA than the other part of the light has, can also be used as light effectively illuminating light diffusion plate 120 (surface to be irradiated).

(Specific Feature of Surface Light Source Device)

In the following, more specific feature of surface light source device 100 will be described. In surface light source device 100 according to the present embodiment, each light emitting device 200 is designed to appropriately illuminate a predetermined region on light diffusion plate 120 and also to increase the contrast of light and dark at the boundary between irradiation and non-irradiation regions. For achieving high contrast of light and dark at the boundary between irradiation and non-irradiation regions, it is preferred that light beam L from light emitting device 200 does not reach the non-irradiation region in a large amount, and the outer edge part of the irradiation region is illuminated brighter than the non-irradiation region is. That is, it is necessary for light beam L emitted onto the outer edge part of the irradiation region to have a small angle relative to central axis CA. In the following, the relationship between light emission angle θ1 and light output angle θ3 is studied. In the present embodiment, center-to-center distance Px between light emitting devices 20 in the first direction (X direction) and center-to-center distance Py between light emitting devices 200 in the second direction (Y direction) are both 90 mm. The distance between substrate 210 and light diffusion plate 120 is 24 mm.

Figure 6A:
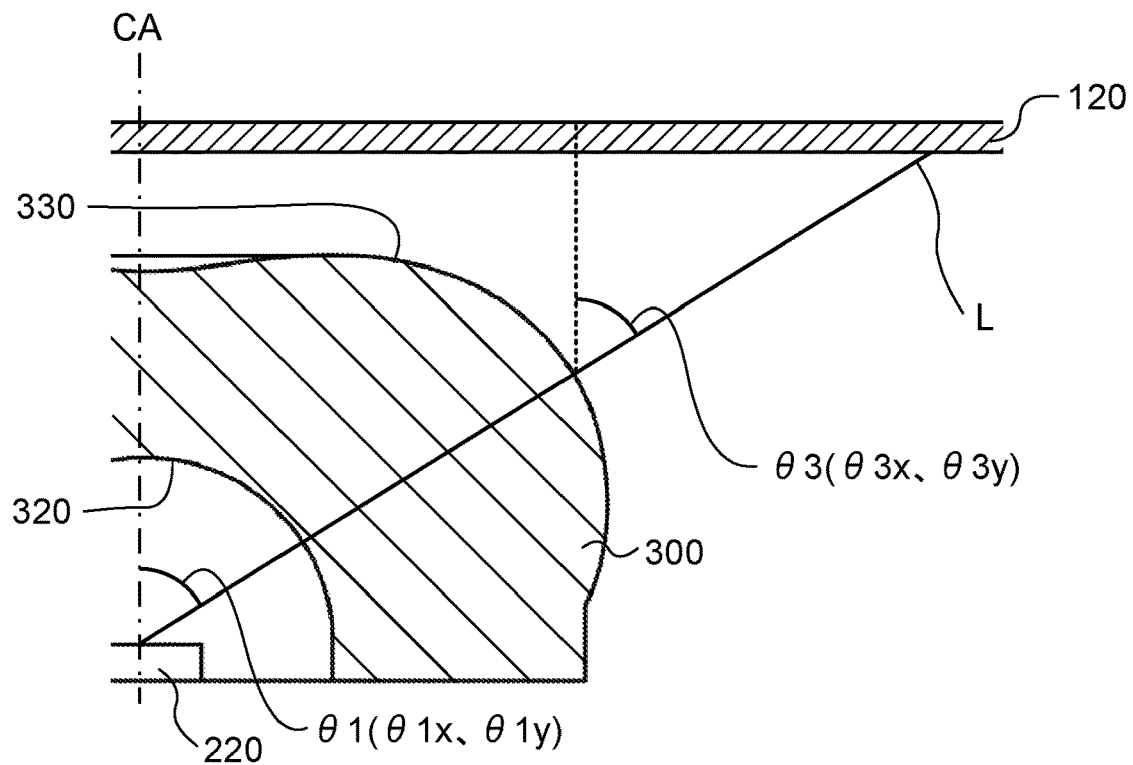
FIG. 6A is a diagram for describing a relationship between a light emission angle and a light output angle.

FIG. 6A is a diagram for describing a relationship between light emission angle θ1 and light output angle θ3. As illustrated in FIG. 6A, on an arbitrary cross section including central axis CA of light flux controlling member 300, the angle of the traveling direction of arbitrary light beam L from the light emitting center of light emitting element 220 to incidence surface 320 relative to central axis CA is referred to as "light emission angle θ1," and the angle of the traveling direction of a light beam, which is emitted from the light emitting center at light emission angle θ1 and which propagates through light flux controlling member 300 and is emitted from emission surface 330 to travel from emission surface 330 to light diffusion plate 120, relative to central axis CA is referred to as "light output angle θ3." In FIG. 6A, "θ1x" is a light emission angle on a first cross section that runs along the first direction (X direction) and includes central axis CA, and "θ1y" is a light emission angle on a second cross section that runs along the second direction (Y direction) and includes central axis CA. In addition, "θ3x" is a light output angle on the first cross section that runs along the first direction (X direction) and includes central axis CA, and "θ3y" is a light output angle on the second cross section that runs along the second direction (Y direction) and includes central axis CA.

Figure 6B:
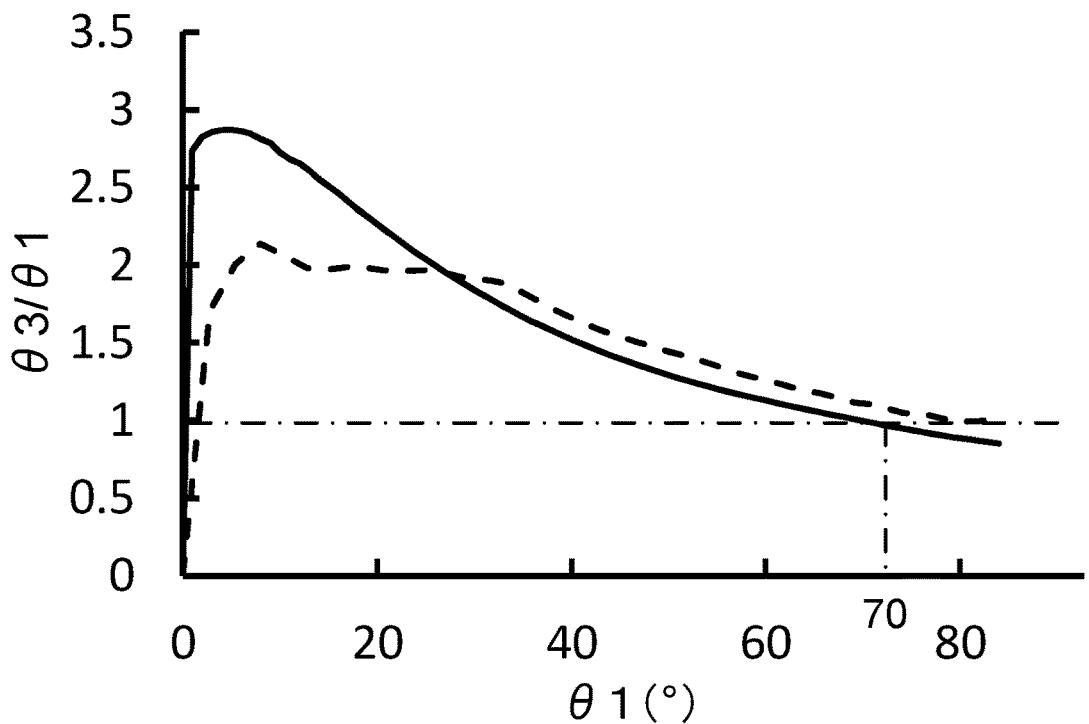
FIG. 6B is a graph showing a relationship between the light emission angle and the value of the light output angle relative to the light emission angle.

FIG. 6B is a graph showing a relationship between light emission angle θ1 and the value of light output angle θ3 relative to light emission angle θ1. In FIG. 6B, the solid line corresponds to surface light source device 100 according to the present embodiment, and the dotted line corresponds to a light emitting device according to a comparative example. The surface light source device according to the comparative example includes light flux controlling members which have a circular shape in plan view and are designed to have distribution such that emitted light is mixed on a surface to be irradiated with light emitted from not only an adjacent light emitting device but also a light emitting device positioned further than the adjacent light emitting device.

As illustrated in FIG. 6B, surface light source device 100 according to the present embodiment is designed to satisfy light output angle θ3/light emission angle θ1<1 in a region satisfying θ1≥70°. This indicates that light beam L having light emission angle θ1 of 70° or more has light output angle θ3 smaller than light emission angle θ1. In the present embodiment, thus, light beam L having light emission angle θ1 of 70° or more is controlled to become concentrated toward central axis CA (optical axis OA) side compared to light beam L having light emission angle θ1 of less than 70°. In the surface light source device according to the comparative example, meanwhile, there is no region that satisfies light output angle θ3/light emission angle θ1<1. Accordingly, in surface light source device 100 according to the present embodiment, light beam L having large light emission angle θ1 satisfies formula (1) below. Light flux controlling member 300 in surface light source device 100 according to the present embodiment is thus designed so that light beam L that satisfies the following formula (1) is generated as light beam L emitted from light emitting element 220.

$$\theta_3/\theta_1 < 1 \qquad \text{Formula (1)}$$

Figure 7A:
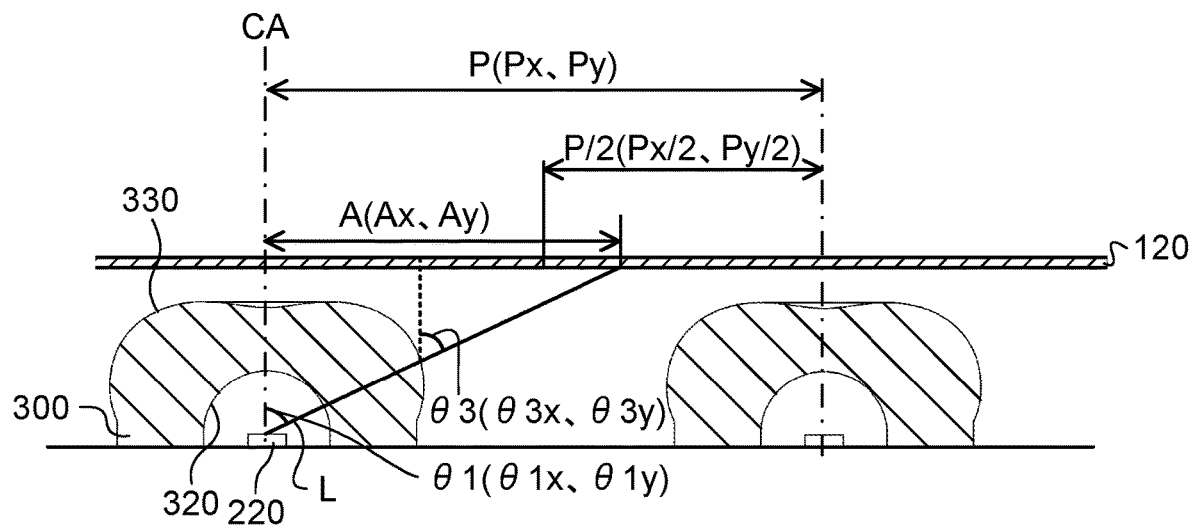
FIG. 7A is a diagram for describing a reaching position of light beam on a light diffusion plate.
Figure 7B:
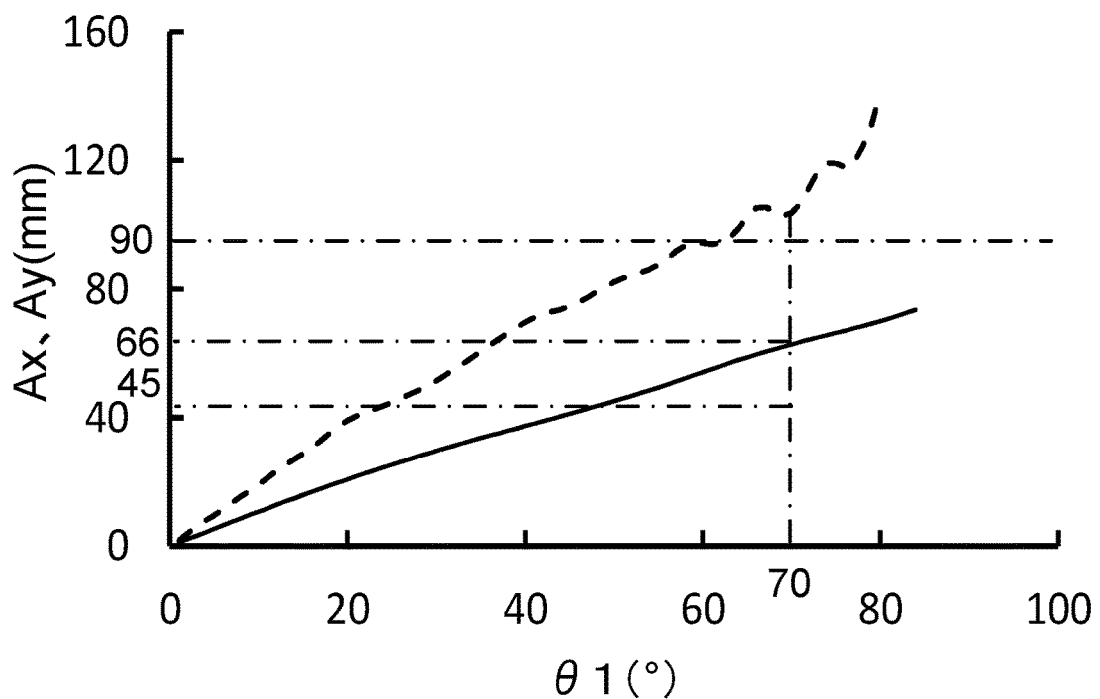
FIG. 7B is a graph showing a relationship between the light emission angle and the distance of the light beam on the light diffusion plate from a central axis.

In the following, the reaching position of light beam L emitted from light emitting device 200 (the light emitting center of light emitting element 220) on light diffusion plate 120 is studied. FIG. 7A is a diagram showing a relationship between light emission angle θ1, and distances Ax and Ay from central axis CA to light beam L having light emission angle θ1 on light diffusion plate 120; and FIG. 7B is a graph showing light emission angle θ1, and distances Ax and Ay from central axis CA to light beam L having light emission angle θ1 on light diffusion plate 120. In FIG. 7B, the solid line corresponds to surface light source device 100 according to the present embodiment, and the dotted line corresponds to the surface light source device according to the comparative example. As described above, light flux controlling member 300 according to the present embodiment is circularly symmetric with central axis CA as a rotation axis, and thus the reaching position of light beam L emitted from the light emitting center of light emitting element 220 on light diffusion plate 120 is the same on any cross sections including central axis CA. In FIG. 7A, "Ax" is the distance on the first cross section from central axis CA to a reaching point on light diffusion plate 120 where a light beam emitted from the light emitting center at light emission angle θ1xmin reaches, and "Ay" is the distance on the second cross section from central axis CA to a reaching point on light diffusion plate 120 where a light beam emitted from the light emitting center at light emission angle θ1ymin reaches.

As shown by the solid line in FIG. 7B, in surface light source device 100 according to the present embodiment, light beam L having the smallest light emission angle θ1 (θ1x, θ1y), namely light emission angle θ1 min (θ1xmin, θ1ymin; 70°) reaches a position of 66 mm (Ax, Ay=66 mm) from central axis CA on light diffusion plate 120. In addition, even light having light emission angle θ1 (θ1x, θ1y) of 70° or more does not reach a position of 90 mm (Ax, Ay=90 mm) from central axis CA on light diffusion plate 120. This indicates that light emitted from this light emitting device 200 does not reach central axes CA of light emitting devices 200 adjacent to this light emitting device 200 in the first direction (X direction) and the second direction (Y direction).

In the surface light source device according to the comparative example, meanwhile, light beam L having light emission angle θ1 (θ1x, θ1y) of 70° or more reaches further than 90 mm from central axis CA on the light diffusion plate. This indicates that light beam L emitted from this light emitting device inevitably reaches central axes CA of light emitting devices adjacent to this light emitting device in the first direction (X direction) and the second direction (Y direction).

Accordingly in the present embodiment, on the first cross section that runs along the first direction (X direction) and includes central axis CA, a light beam having the smallest light emission angle θ1x, namely light emission angle θ1xmin among light beams satisfying the above formula (1) reaches light diffusion plate 120 so as to satisfy formula (2) below. In addition, on the second cross section that runs along the second direction (Y direction) and includes central axis CA, a light beam having the smallest light emission angle θ1y, namely light emission angle θ1ymin among light beams satisfying the above formula (1) reaches light diffusion plate 120 so as to satisfy formula (3) below. Light flux controlling member 300 in surface light source device 100 according to the present embodiment is thus designed to satisfy the following formulas (2) and (3).

$$Px/2 < Ax < Px \quad \text{Formula (2)}$$

$$Py/2 < Ay < Py \quad \text{Formula (3)}$$

The reason why the solid line and dotted line fail to continue up to the end in FIG. 7B is because light beam L cannot be controlled when light emission angle θ1 becomes larger than a predetermined angle (about 84° in the present embodiment) due to the influence of the flange of light flux controlling member 300, the distance between light flux controlling member 300 and light emitting element 220, and the like. As the position on light diffusion plate 120 where a light beam having light emission angle θ1 larger than a predetermined angle reaches cannot be determined, light beams having light emission angle θ1 larger than the predetermined angle are not shown in FIG. 7B.

In the following, luminance distribution on light diffusion plate 120 is studied for surface light source device 100 using the above described light flux controlling member 300. For the comparison, luminance distribution on light diffusion plate 120 is studied for the surface light source device according to the comparative example. In each of the surface light source devices according to the present embodiment and the comparative example, only one light emitting element 220 is lit.

Figure 8A:
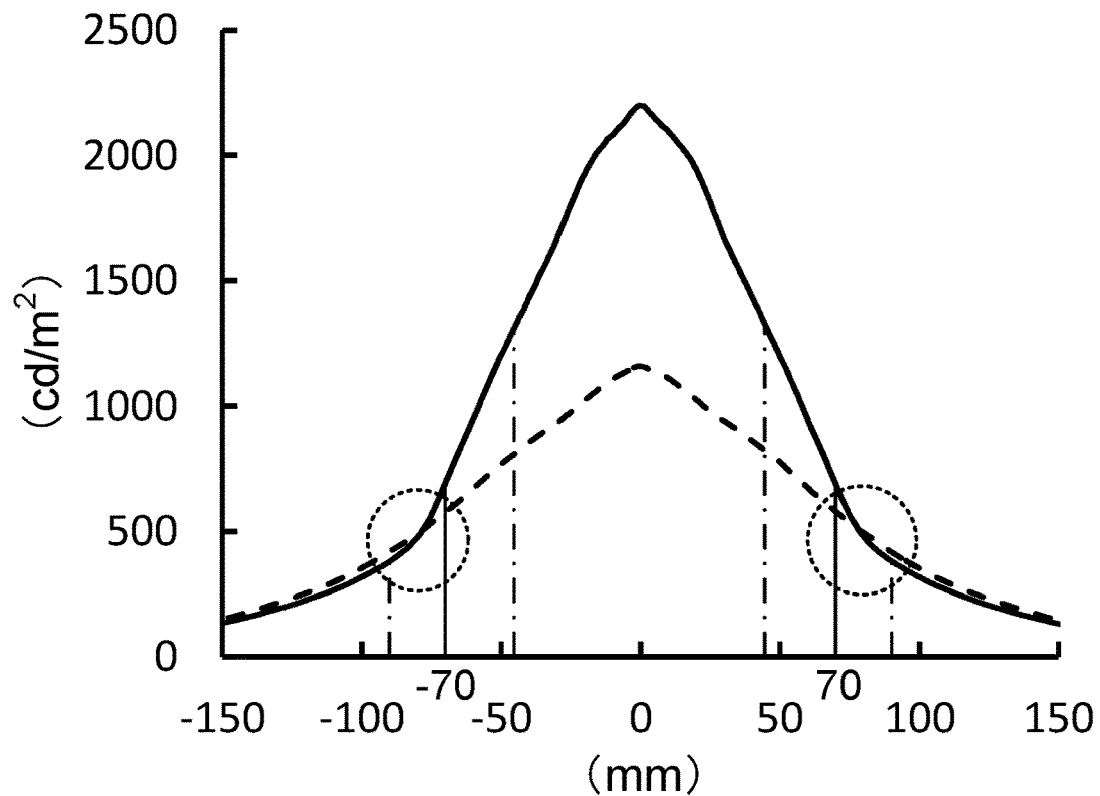
FIG. 8A is a graph showing the luminance distribution from a light emitting device.

FIG. 8A is a graph showing the luminance distribution on light diffusion plate 120 on a cross section including central axis CA in surface light source device 100. The abscissa represents the distance (mm) from central axis CA, and the ordinate represents the luminance (cd/m²) in FIG. 8A. In FIG. 8A, the solid line shows the results for surface light source device 100 according to the present embodiment, and the dotted line shows the results for the surface light source device according to the comparative example. In FIG. 8A, the one-dot chain line shows the center-to-center distance between light emitting devices 200 (Px, Py: ±90 mm), or the half of the center-to-center distance between light emitting devices 200 (Px/2, Py/2: ±45 mm).

As shown by a region circled with a dotted line in FIG. 8A, there is a change region in which the slope of the line indicating the luminance suddenly becomes gentle as the distance from the central axis CA increases in surface light source device 100 according to the present embodiment. This sudden change indicates that the contrast of light and dark between irradiation and non-irradiation regions on light diffusion plate 120 is high in surface light source device 100 according to the present embodiment.

In the surface light source device of the comparative example, meanwhile, the slope of the line indicating the luminance does not change much as the distance from the central axis CA increases. This slow change indicates that the luminance gradually decreases as the distance from the central axis CA increases in the surface light source device of the comparative example. The contrast of light and dark between irradiation and non-irradiation regions on the light diffusion plate is thus low.

Figure 8B:
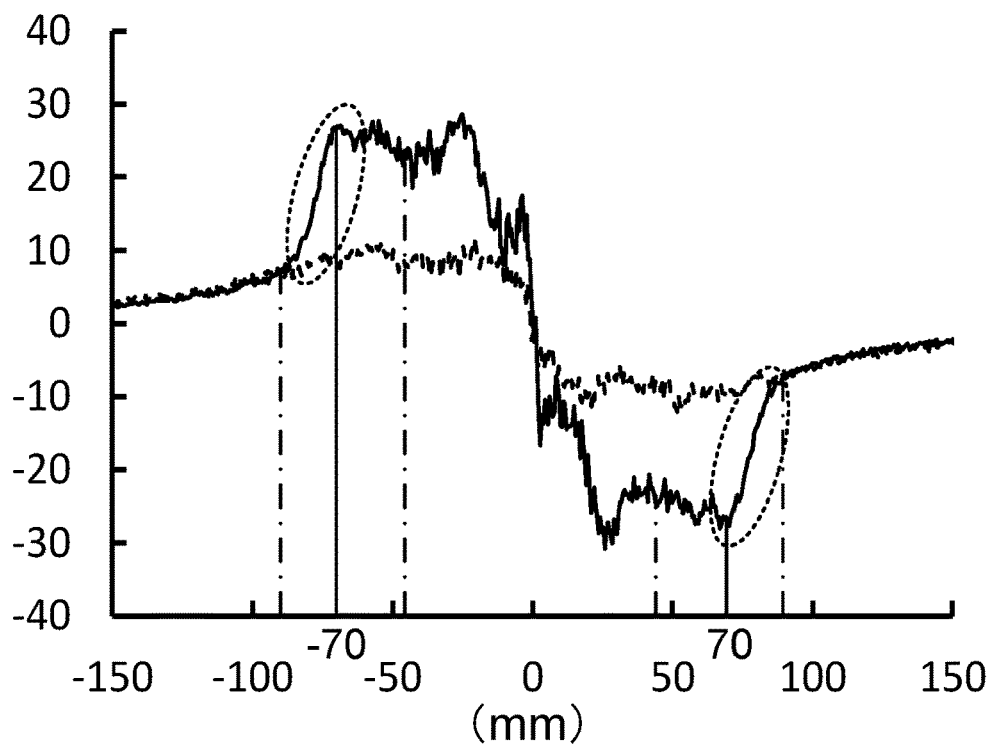
FIG. 8B is a graph showing a first-order differential value of the luminance.

For clarifying the position of the change region, the luminance is then differentiated by the distance from central axis CA. FIG. 8B is a graph showing differential value obtained by a first-order differentiation of the luminance shown in FIG. 8A by the distance from central axis CA. The abscissa represents the distance (mm) from central axis CA, and the ordinate represents a first-order differential value of luminance in FIG. 8B. In FIG. 8B, the solid line shows the results for surface light source device 100 according to the present embodiment, and the dotted line shows the results for the surface light source device according to the comparative example. In FIG. 8B, the one-dot chain line shows the center-to-center distance between light emitting devices 200 (Px, Py: ±90 mm), or the half of the center-to-center distance between light emitting devices 200 (Px/2, Py/2: ±45 mm).

As shown by the solid line in FIG. 8B, the change regions of surface light source device 100 in the present embodiment are each present between the reaching position (±66 mm) of light beam L emitted at light emission angle θ1xmin on light diffusion plate 120 and the center-to-center distance Px, Py (±90 mm) of light emitting devices 200. Unlike surface light source device 100 according to the present embodiment, there is no change region in which a differential value drastically changes in the surface light source device according to the comparative example as shown by the dotted line in FIG. 8B.

In the following, light beam L having light emission angle θ1 of less than 70° in the present embodiment will be described. As shown in FIG. 6B, light having light emission angle θ1 of less than 70° satisfies light output angle θ3/light emission angle θ1≥1. This indicates that light beam L having light emission angle θ1 of less than 70° has light output angle θ3 larger than light emission angle θ1. That is, in the present embodiment, light beam L is controlled to expand when light emission angle θ1 is less than 70° as compared to when light emission angle θ1 is 70° or more. Accordingly, in surface light source device 100 according to the present embodiment, light beam L having relatively small light emission angle θ1 preferably satisfies formula (5) below. Light flux controlling member 300 in surface light source device 100 according to the present embodiment is thus preferably designed so that light beam L that satisfies the following formula (5) is generated as light beam L emitted from light emitting element 220.

$$\theta 3/\theta 1 \geq 1 \quad \text{Formula (5)}$$

In the following, the reaching position of light beam L emitted from light emitting device 200 (the light emitting center of light emitting element 220) on light diffusion plate 120 is studied. Though not illustrated, light beam L satisfying formula (5) reaches between central axis CA and a position of 45 mm from central axis CA (Ax, Ay=45 mm). Accordingly, a light beam reaching light diffusion plate 120 so as to satisfy formulas (6) and (7) satisfies the above formula (5). Light flux controlling member 300 in surface light source device 100 according to the present embodiment is thus preferably designed to satisfy the following formulas (6) and (7).

$$Ax \leq Px/2 \qquad \text{Formula (6)}$$

$$Ay \leq Py/2 \qquad \text{Formula (7)}$$

(Relationship Between Distance D from Substrate to Light Diffusion Plate and Luminance Distribution)

Figure 9:
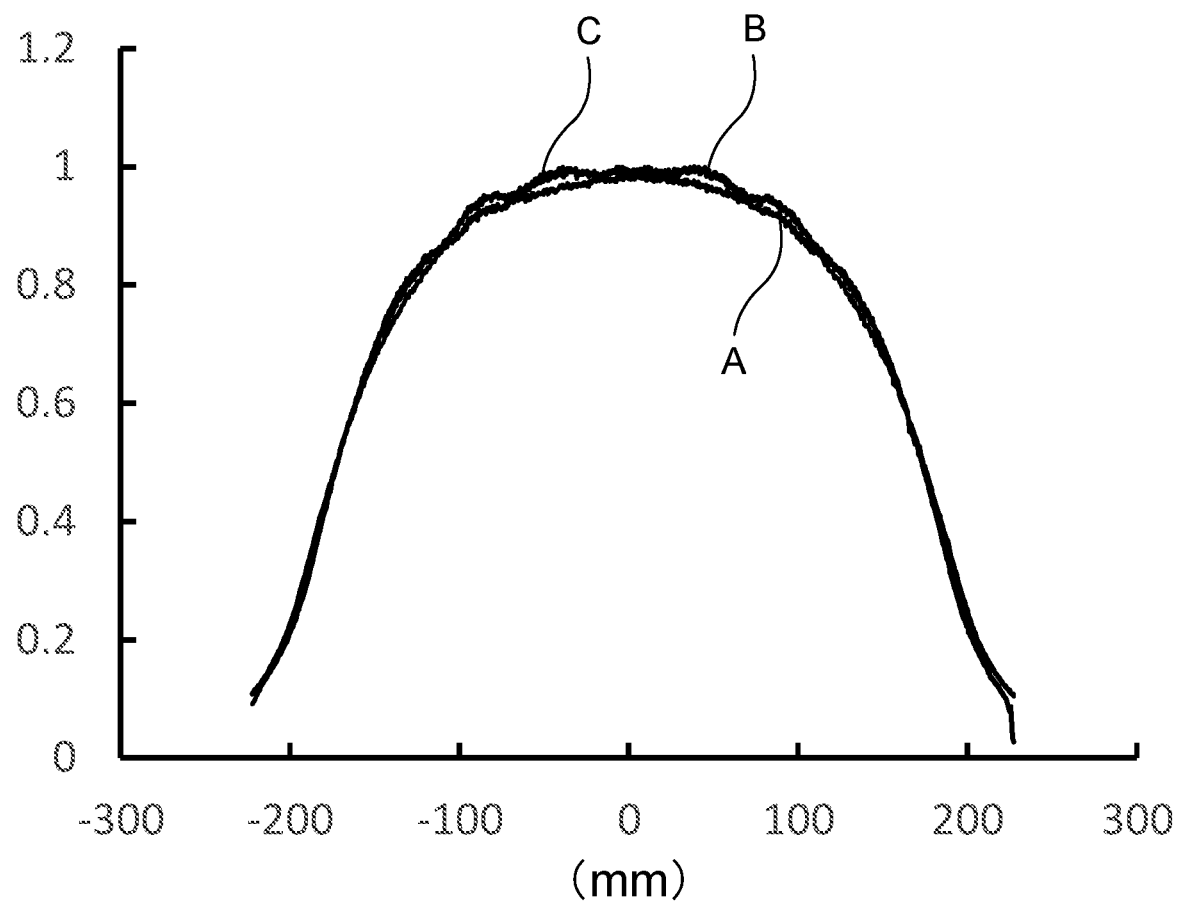
FIG. 9 is a graph showing the luminance distribution on a surface light source device.

In the following, with distance D between substrate 210 and light diffusion plate 120 changed, luminance distribution is studied by measuring luminance in surface light source device 100. FIG. 9 is a graph which standardizes the luminance distribution of surface light source device 100. The abscissa represents the distance (mm) from central axis CA, and the ordinate represents a standard value of luminance in FIG. 9. In this measurement, three light emitting elements 220 arranged along the first direction (X direction) are lit, and the luminance distribution on the straight line including respective central axes CA of three light emitting elements 220 on light diffusion plate 120 is studied.

In FIG. 9, line A shows the result for surface light source device 100 having distance D (between substrate 210 and light diffusion plate 120) of 24 mm, line B shows the result for surface light source device 100 having distance D of 25 mm, and line C shows the result for surface light source device 100 having distance D of 26 mm.

As shown in FIG. 9, even when distance D between substrate 210 and light diffusion plate 120 changes, the luminance on light diffusion plate 120 is substantially unchanged.

(Effects)

In surface light source device 100 according to the present embodiment, light satisfying $\theta 3/\theta 1 < 1$ satisfies $Px/2 < Ax < Px$ on the first cross section, and $Py/2 < Ay < Py$ on the second cross section. Surface light source device 100 according to the present embodiment is thus designed to uniformly irradiate light diffusion plate 120 regardless of the distance between substrate 210 and light diffusion plate 120. As light emitted from light emitting device 200 does not reach central axes CA of adjacent light emitting devices 200 in surface light source device 100 in the first direction (X direction) and the second direction (Y direction), light diffusion plate 120 can be uniformly illuminated.

Embodiment 2

(Configuration of Surface Light Source Device)

A surface light source device according to Embodiment 2 differs from surface light source device 100 according to Embodiment 1 in the arrangement of light emitting devices 400 and feature of light flux controlling member 500. The configurations the same as those of Embodiment 1 are given the same symbols as those of Embodiment 1, and the description thereof is omitted.

Figure 10:
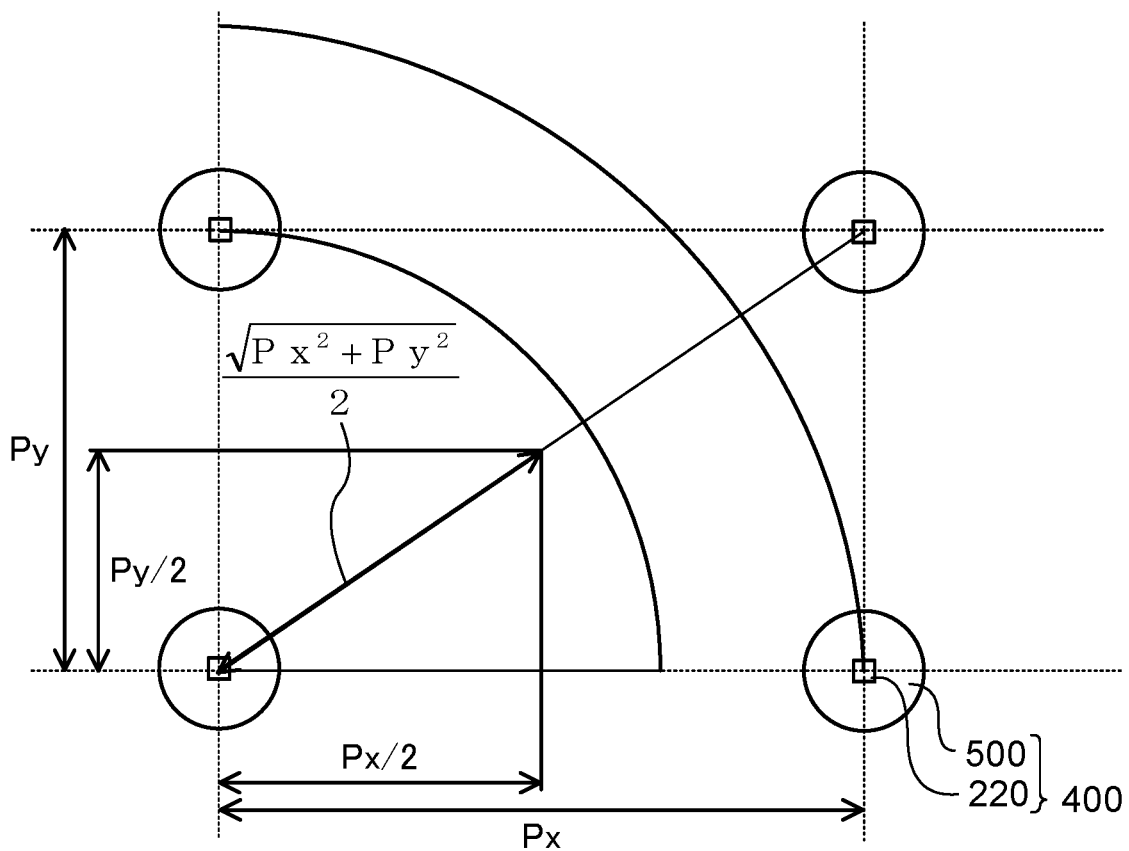
FIG. 10 is a diagram for describing an arrangement of light emitting devices in a surface light source device according to Embodiment 2.

FIG. 10 is a diagram for describing the arrangement of light emitting devices 400 according to Embodiment 2. As illustrated in FIG. 10, in the surface light source device according to Embodiment 2, center-to-center distance Px between light emitting devices 400 in the first direction (X direction) is different from center-to-center distance Py between light emitting devices 400 in the second direction (Y direction). That is, light emitting devices 400 are arranged in a lattice so that the unit lattice thereof has a rectangular shape in the surface light source device according to Embodiment 2. The ratio between center-to-center distance Px and center-to-center distance Py may be appropriately selected. Center-to-center distance Px may be longer than center-to-center distance Py, or center-to-center distance Py may be longer than center-to-center distance Px. In the present embodiment, center-to-center distance Px is longer than center-to-center distance Py. The ratio of center-to-center distance Px to center-to-center distance Py is preferably 1 to 1 to 1 to 2.

Even when center-to-center distance Px and center-to-center distance Py are different as illustrated in FIG. 10, formulas (1) to (3) shown in Embodiment 1 should also be satisfied in Embodiment 2 for increasing the contrast of light and dark between irradiation and non-irradiation regions. The shape of the irradiation region of light beam L according to Embodiment 2 thus becomes oval. In addition, in the surface light source device according to Embodiment 2, the reaching position of light beam L on a third cross section that runs along the direction of a diagonal of the unit lattice and includes central axis CA is preferably taken into consideration as well as formulas (1) to (3) for avoiding the generation of a bright part and a dark part in the diagonal direction of the unit lattice.

In this case, for increasing the contrast of light and dark between irradiation and non-irradiation regions on the third cross section, it is also preferred on the third cross section that light beam L from light emitting device 400 does not reach the non-irradiation region in a large amount, and the outer edge part of the irradiation region is illuminated brighter than the non-irradiation region is. That is, it is necessary for light beam L emitted onto the outer edge part of the irradiation region to have a small angle relative to central axis CA.

More specifically, on the third cross section, a light beam having the smallest light emission angle $\theta 1$, namely light emission angle $\theta 1xymin$ among light beams satisfying the above formula (1) preferably reaches a certain position of light diffusion plate 120. The position is further from central axis CA than the half of the length of the diagonal of the lattice is, and closer to central axis CA than center-to-center distance Px and center-to-center distance Py. That is, on the third cross section that runs along the diagonal direction of the lattice and includes central axis CA, the light beam having the smallest light emission angle $\theta 1$, namely light emission angle $\theta 1xymin$ among light beams satisfying the above formula (1) preferably satisfies the following formula (4).

$$\frac{\sqrt{Px^2 + Py^2}}{2} < Ax\,y < Px,\,Py \qquad \text{Formula 4}$$

(Effects)

In addition to the effect the same as that of Embodiment 1, the surface light source device according to Embodiment 2 can thus uniformly irradiate a surface to be irradiated even when center-to-center distance Px and center-to-center distance Py have different lengths.

This application claims priority based on Japanese Patent Application No. 2017-040964, filed on Mar. 3, 2017, the entire contents of which including the specification and the drawings are incorporated herein by reference.

INDUSTRIAL APPLICABILITY

The surface light source device according to the present invention may be employed, for example, in a backlight of a liquid crystal display apparatus or a general lighting.

REFERENCE SIGNS LIST

10 Surface light source device
20 Printed wiring substrate
30 Light emitting device
35 Light emitting element
40 Light guide member
41 Lens
42 Flange
43 Recess
44 Incidence surface
45 Emission surface
46 Flat surface
47 Curved surface
100 Surface light source device
100' Display apparatus
107 Irradiation member
110 Casing
112 Bottom plate
114 Top plate
120 Light diffusion plate
200, 400 Light emitting device
210 Substrate
220 Light emitting element
300, 500 Light flux controlling member
305 Rear surface
310 Recess
320 Incidence surface
330 Emission surface
330a First emission surface
330b Second emission surface
330c Overhanging part
CA Central axis of light flux controlling member
OA Optical axis of light emitting element

What is claimed is:

1. A surface light source device, comprising:

light emitting devices each including a light emitting element and a light flux controlling member configured to control a distribution of light emitted from the light emitting element, wherein a light emitting center of the light emitting element is positioned on a central axis of the light flux controlling member, and the light emitting devices are arranged in a shape of a lattice such that a center-to-center distance in a first direction is Px, and a center-to-center distance in a second direction orthogonal to the first direction is Py; and a light diffusion plate disposed on a front side of the light emitting devices, the light diffusion plate transmitting light emitted from the light emitting devices while diffusing the light, wherein the light flux controlling member includes an incidence surface that is an inner surface of a recess opened to a rear side, the incidence surface being disposed to intersect the central axis; and an emission surface disposed on the front side, the emission surface including a first emission surface disposed to intersect the central axis, and a second emission surface disposed to surround the first emission surface, the second emission surface protruding toward the front side, and wherein for each of the light emitting devices, on a first cross section that runs along the first direction and includes the central axis, a light beam having smallest light emission angle θ1 among light beams satisfying formula (1) below reaches the light diffusion plate so as to satisfy formula (2) below, the smallest light emission angle θ1 being light emission angle θ1xmin; and wherein for each of the light emitting devices, on a second cross section that runs along the second direction and includes the central axis, a light beam having smallest light emission angle θ1 among the light beams satisfying the formula (1) below reaches the light diffusion plate so as to satisfy formula (3) below, the smallest light emission angle θ1 being light emission angle θ1ymin, $$\theta 3/\theta 1 < 1 \qquad \text{Formula (1)}$$

[wherein θ1 is an angle of a traveling direction of an arbitrary light beam relative to the central axis, wherein the arbitrary light beam travels from the light emitting center to the incidence surface; and θ3 is an angle of a traveling direction of the arbitrary light beam relative to the central axis, wherein the arbitrary light beam is emitted from the light emitting center at light emission angle θ1, propagates through the light flux controlling member and is emitted from the emission surface to travel from the emission surface to the light diffusion plate]

$$Px/2 < Ax < Px \qquad \text{Formula (2)}$$

[wherein on the first cross section, Ax is a distance from the central axis to a reaching point on the light diffusion plate where the light beam emitted from the light emitting center at light emission angle θ1xmin reaches]

$$Py/2 < Ay < Py \qquad \text{Formula (3)}$$

[wherein on the second cross section, Ay is a distance from the central axis to a reaching point on the light diffusion plate where the light beam emitted from the light emitting center at light emission angle θ1ymin reaches].

2. The surface light source device according to claim 1, wherein for each of the light emitting devices, on a third cross section that runs along a diagonal direction of the lattice and includes the central axis, a light beam having smallest light emission angle θ1 among the light beams satisfying the formula (1) satisfies formula (4) below, the smallest light emission angle θ1 being light emission angle θ1xymin, $$\frac{\sqrt{Px^2 + Py^2}}{2} < Ax\,y < Px, Py \qquad \text{Formula (4)}$$

[wherein on the third cross section, Axy is a distance from the central axis to a reaching point on the light diffusion plate where the light beam emitted from the light emitting center at light emission angle θ1xymin reaches].

3. The surface light source device according to claim 2, wherein the light emitting devices are disposed in a shape of a square lattice.

4. The surface light source device according to claim 3, wherein a light beam reaching the light diffusion plate so as to satisfy formulas (6) and (7) below satisfies formula (5) below, $$\theta 3/\theta 1 \geq 1 \quad \text{Formula (5)}$$

$$Ax \leq Px/2 \quad \text{Formula (6)}$$

$$Ay \leq Py/2 \quad \text{Formula (7).}$$

5. A display apparatus, comprising:
the surface light source device according to claim 4, and
an irradiation member to be irradiated with light emitted from the surface light source device.

6. A display apparatus, comprising:
the surface light source device according to claim 3, and
an irradiation member to be irradiated with light emitted from the surface light source device.

7. The surface light source device according to claim 2, wherein a light beam reaching the light diffusion plate so as to satisfy formulas (6) and (7) below satisfies formula (5) below, $$\theta 3/\theta 1 \geq 1 \quad \text{Formula (5)}$$

$$Ax \leq Px/2 \quad \text{Formula (6)}$$

$$Ay \leq Py/2 \quad \text{Formula (7).}$$

8. A display apparatus, comprising:
the surface light source device according to claim 7, and
an irradiation member to be irradiated with light emitted from the surface light source device.

9. A display apparatus, comprising:
the surface light source device according to claim 2, and
an irradiation member to be irradiated with light emitted from the surface light source device.

10. The surface light source device according to claim 1, wherein the light emitting devices are disposed in a shape of a square lattice.

11. The surface light source device according to claim 10, wherein a light beam reaching the light diffusion plate so as to satisfy formulas (6) and (7) below satisfies formula (5) below, $$\theta 3/\theta 1 \geq 1 \quad \text{Formula (5)}$$

$$Ax \leq Px/2 \quad \text{Formula (6)}$$

$$Ay \leq Py/2 \quad \text{Formula (7).}$$

12. A display apparatus, comprising:
the surface light source device according to claim 11, and
an irradiation member to be irradiated with light emitted from the surface light source device.

13. A display apparatus, comprising:
the surface light source device according to claim 10, and
an irradiation member to be irradiated with light emitted from the surface light source device.

14. The surface light source device according to claim 1, wherein a light beam reaching the light diffusion plate so as to satisfy formulas (6) and (7) below satisfies formula (5) below, $$\theta 3/\theta 1 \geq 1 \quad \text{Formula (5)}$$

$$Ax \leq Px/2 \quad \text{Formula (6)}$$

$$Ay \leq Py/2 \quad \text{Formula (7).}$$

15. A display apparatus, comprising:
the surface light source device according to claim 14, and
an irradiation member to be irradiated with light emitted from the surface light source device.

16. A display apparatus, comprising:
the surface light source device according to claim 1, and
an irradiation member to be irradiated with light emitted from the surface light source device.

* * * * *